United States Patent
Veggalam et al.

(10) Patent No.: US 10,805,809 B2
(45) Date of Patent: Oct. 13, 2020

(54) FEMTOCELL PROVISIONING AND SERVICE ISSUE OPTIMIZATION

(71) Applicant: T-Mobile USA, Inc., Bellevue, WA (US)

(72) Inventors: Vijay Veggalam, Morris Plains, NJ (US); Florendo Atienza, Rentong, WA (US); Jeremy Babb, Maple Valley, WA (US); Kendall Bush, Austin, TX (US); Suchit Satpathy, Hackettstown, NJ (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/976,689

(22) Filed: May 10, 2018

(65) Prior Publication Data
US 2018/0332481 A1  Nov. 15, 2018

Related U.S. Application Data (60) Provisional application No. 62/505,709, filed on May 12, 2017.

(51) Int. Cl.
*H04W 16/22*  (2009.01)
*H04W 24/02*  (2009.01)
(Continued)

(52) U.S. Cl.
CPC ........... *H04W 16/22* (2013.01); *H04W 24/02* (2013.01); *G06N 20/00* (2019.01); *H04W 24/08* (2013.01); *H04W 84/045* (2013.01)

(58) Field of Classification Search
CPC ..... H04W 16/22; H04W 24/02; H04W 24/08; H04W 84/045; G06N 20/00
See application file for complete search history.

(56) References Cited

U.S. PATENT DOCUMENTS 9,843,473 B2   12/2017  Satpathy
2006/0128406 A1*  6/2006  Macartney .......... H04L 63/1416
                                                          455/466
(Continued)

FOREIGN PATENT DOCUMENTS

KR   20150115337 A   10/2015

OTHER PUBLICATIONS

International Search Report and Written Opinion for PCT Application No. PCT/US2018/032412 dated Aug. 30, 2018, 16 pages.

*Primary Examiner* — Jae Y Lee
(74) *Attorney, Agent, or Firm* — Han Santos, PLLC (57) ABSTRACT

This disclosure describes techniques for optimizing operational performance of femtocell devices deployed within a telecommunications network. More particularly, a femtocell Optimization (FCO) system is described that detects service issues that affect femtocell device(s). In some instances, the FCO system may automatically deploy a service resolution for known service issues or alerts network representatives for unresolved service issues. Moreover, the FCO system may be further configured to optimize resource utilization of a femtocell device network by preemptively correcting femtocell provisioning issues, based on patterns of historic service issues. The FCO system may further optimize resource usage of femtocell devices by selectively intercepting and terminating connectivity requests (i.e. rejecting issuance of Internet Protocol (IP) addresses) from client devices, or client device types, that have not historically overwhelmed femtocell network resources. The FCO system may further generate a femtocell analysis model to preemptively deploy service resolutions that protect against probable degradations in performance.

19 Claims, 5 Drawing Sheets

(51) Int. Cl.
    *H04W 84/04*     (2009.01)
    *H04W 24/08*     (2009.01)
    *G06N 20/00*     (2019.01)

(56) References Cited

U.S. PATENT DOCUMENTS

| | | | |
|---|---|---|---|
| 2010/0246482 A1* | 9/2010 | Erceg | H04W 16/28 370/328 |
| 2011/0093913 A1* | 4/2011 | Wohlert | H04L 63/101 726/1 |
| 2011/0151862 A1* | 6/2011 | French | H04W 24/08 455/424 |
| 2012/0265717 A1 | 10/2012 | Narayanan et al. | |
| 2014/0034698 A1 | 2/2014 | Cooper | |
| 2014/0148143 A1 | 5/2014 | Choi et al. | |
| 2017/0019291 A1* | 1/2017 | Tapia | G06N 20/00 |
| 2017/0353991 A1* | 12/2017 | Tapia | G06Q 10/20 |

\* cited by examiner

FEMTOCELL PROVISIONING AND SERVICE ISSUE OPTIMIZATION

RELATED APPLICATIONS

This application claims priority to, commonly owned U.S. Provisional Patent Application No. 62/505,709 filed on May 12, 2017, and titled "Femtocell Optimization via Machine Learning," which is herein incorporated by reference in its entirety.

BACKGROUND

The increasing use of wireless communication devices has led to a corresponding increase in wireless carrier infrastructure. While far-reaching, the wireless carrier infrastructure may not provide robust and reliable service to all locations. For example, macro-cell coverage may provide wireless cellular service to a city or a metropolis; however, there are various factors that can influence the reliability of the available coverage.

One approach to increasing the quality of service (QoS) to locations where the wireless carrier signal strength is less robust or reliable is the installation of a femtocell device to incrementally extend coverage areas. However, as the number of wireless communication devices continues to grow, the complexity of a network of femtocell devices may increase at a corresponding rate. Thus, troubleshooting provisioning problems and service issues may prove time-consuming and frustrating.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes techniques for optimizing operational performance of femtocell devices deployed within a telecommunications network. More particularly, a femtocell Optimization (FCO) system is described that detects service issues that affect femtocell device(s). Service issues may relate to data packet loss, data latency, jitter, echo, downlink throughput, or uplink throughput at a femtocell device. In some instances, the FCO system may automatically deploy a service resolution for known service issues or alerts to network representatives for unresolved service issues. Moreover, the FCO system may be further configured to optimize resource utilization of a femtocell device network by preemptively correcting femtocell provisioning issues, based on patterns of historic service issues. The FCO system may further optimize resource usage of femtocell devices by selectively intercepting and terminating connectivity requests (i.e. rejecting issuance of Internet Protocol (IP) addresses) from client devices, or client device types, that have historically overwhelmed femtocell network resources and caused performance degradations that can be considered service issues.

A femtocell device, as described herein, is a low-power, base-station device the creates areas of increased service capacity for a telecommunications network. These areas of increased capacity are referred to as femtocells. A femtocell device may comprise a low power base-station transceiver that is typically connected to the internet via cable DSL, fiber optic link, or other suitable technology. This connection allows the femtocell device to connect to the core network of a telecommunications network, and further provide service to wireless communication devices registered with the femtocell device.

In one example, the FCO system may retrieve femtocell service data associated with a femtocell device. Femtocell service data may include provisioning data and tunnel data. Provisioning data may relate to configuration settings that ensure that a femtocell device is appropriately configured to service a predetermined geographic area. The provisioning data may include communication data packets sent to and from the femtocell device, identity information of the femtocell device, and associated settings for provisioning the femtocell device. Tunnel data may include data relating to a communicative connection that is established, via a femtocell device, between a client device and an intended destination IP address. Tunnel data may include a device identifier associated with the client device initiating the communicative connection via the femtocell device or a source IP address associated with the client device, and an intended destination IP address as specified by the client device. The tunnel data may further include a timestamp indicating when the tunnels were created, packet information indicating the size and type of data packets being sent and/or received, and the endpoints of the tunnels. The tunnels, as described herein, refer to the communicative connection established by a client device via a femtocell device, the client device being one endpoint of the tunnel.

In some examples, the FCO system may retrieve at least a portion of femtocell service data, as part of network-node service data, from network nodes that interact with the femtocell device. A network node may correspond to a hardware infrastructure or software infrastructure of the telecommunications network. In one example, network nodes may include a femtocell management server, an Operations Support Systems/File (OSS/F) server, or a Service Management Platform (SMP) server associated with the telecommunications network. In this example, the FCO system may retrieve a remaining portion of the femtocell service data, if any, from the femtocell device itself.

In one example, the FCO system may monitor femtocell device(s) that service a telecommunications network within a predetermined geographic area, and network node(s) that interact with the femtocell device(s). The purpose of monitoring femtocell device(s) and network node(s) is to determine a likely root cause of a performance degradation (i.e. service issue) that is impacting a femtocell device. For example, a femtocell device may exhibit the effects of a service issue (i.e. degraded performance state), however the cause of the service issue may reside with a network node that interacts with the femtocell device.

Figure 1:
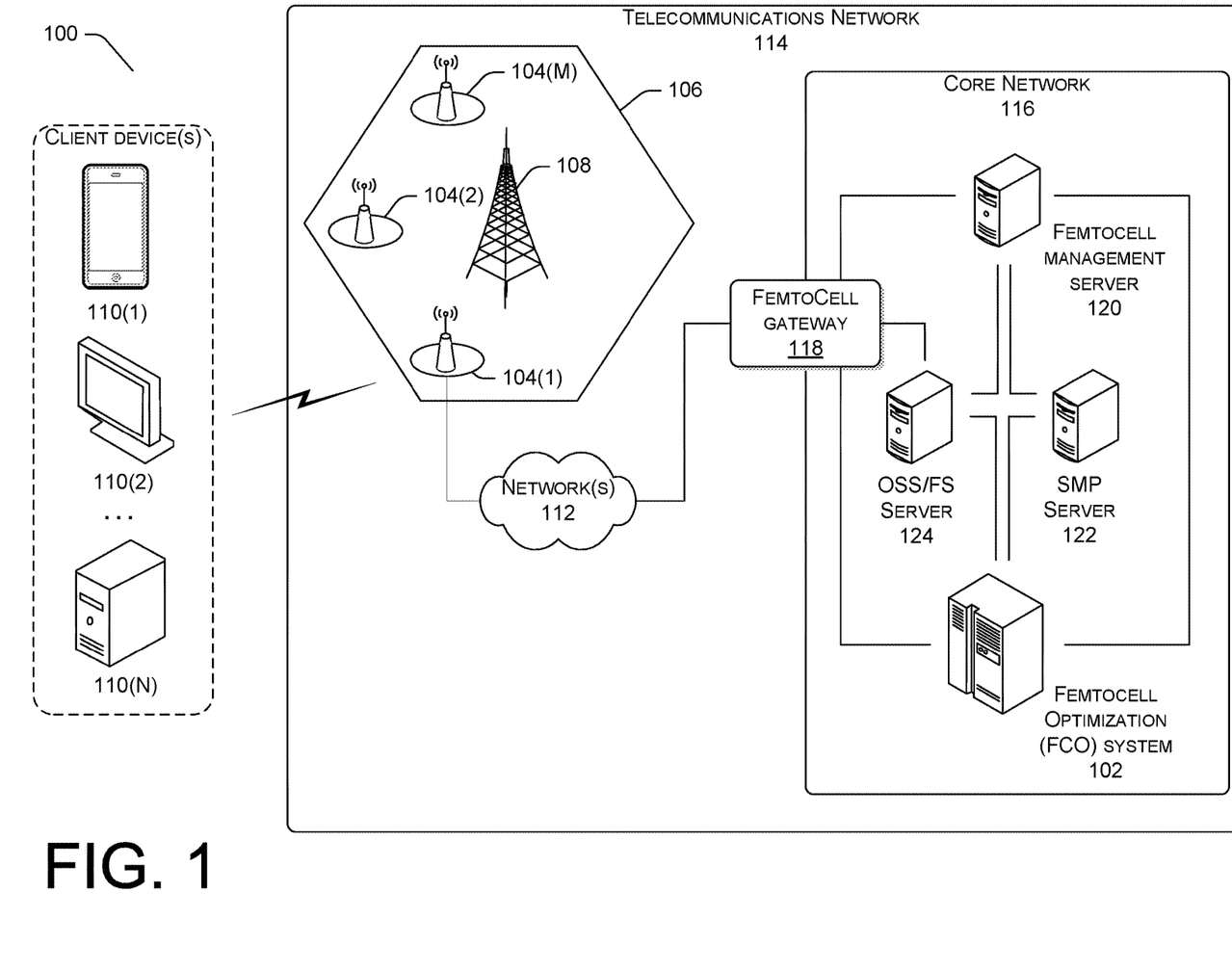
FIG. 1 illustrates a schematic view of a computing environment 100 that facilitates detecting service issues within a femtocell network and detecting service issues within a corresponding femtocell device.

In response to monitoring femtocell device(s) and network node(s), the FCO system may retrieve femtocell service data from the femtocell device(s), network-node service data from network node(s) that interact with the femtocell device(s). The network-node service data may include, but is not limited to, an indication of network latency, downlink throughput, uplink throughput, or a network-specific data associated with hardware or software elements. In a non-limiting example, network-node service data may correspond to provisioning data provided to femtocell device(s) by one of the OSS/FS server 124, SMP server 122, or femtocell management server 120, network node(s).

The FCO system may monitor and retrieve femtocell service data and network-node service data within a telecommunications network on a continuous basis, per a predetermined schedule, or in response to a triggering event. The predetermined schedule may be one hour, 12 hours, or 24 hours. Any time interval is possible. Further, the triggering event may correspond to receipt of an indication that a performance state of the telecommunications network within the predetermined geographic area has fallen below a predetermined Quality of Service (QoS) threshold. The QoS threshold may correspond to a minimum quality of service measure of voice or data transmissions over the telecommunications network. More specifically, the QoS threshold may relate to data packet loss, data latency, jitter, echo, downlink throughput, or uplink throughput. The QoS thresholds may be set up by an administrator of the telecommunications network or an administrator the FCO system.

Further, the FCO system may analyze the femtocell service data associated with the femtocell device(s) to determine whether the performance state of at least one femtocell device is greater than or equal to a predetermined threshold QoS for interfacing client devices. The performance state of the femtocell device may correspond to a QoS parameter, such as but not limited to, data packet loss, data latency, jitter, echo, downlink throughput, or uplink throughput. A performance state that is less than a QoS threshold may indicate that a service issue, also known as a performance degradation, exists. Alternatively, a performance state greater than or equal to a predetermined QoS threshold may indicate that a service issue (i.e. performance degradation) does not exist.

In cases where a performance state of an impacted femtocell device is less than a predetermined QoS threshold, the FCO system may employ one or more trained machine learning models to further determine a likely cause of a performance degradation (i.e. service issue). In one example, the FCO system may use one or more trained machine learning algorithms to correlate femtocell service data associated with an impacted femtocell device with historical femtocell service data associated with a subset of femtocell device(s), and network-node service data associated with network node(s) that interact with the impacted femtocell device and/or subset of femtocell device(s), with historical network-node service data. In this way, the FCO system may determine whether a likely cause of the performance degradation (i.e. service issue) affecting the impacted femtocell device originates at the impacted femtocell device itself, or an interacting network node. A subset of femtocell device(s) may correspond one of the femtocell device that is exhibiting a degraded performance state, a grouping of femtocell device(s) that service a same predetermined geographic area within the telecommunications network, or a grouping of similar types of femtocell device(s) within the telecommunications network.

In another example, the FCO system may generate a femtocell analysis model using historical femtocell service data and historical network-node service data. In doing so, the FCO system may identify a likely cause of a performance degradation (i.e. service issue) by correlating current femtocell service data and current network-node service data with data-points of the femtocell analysis model. In some examples, the FCO system may generate the femtocell analysis models by further correlating historical service issues that have impacted one or more femtocell device(s) with the historical femtocell service data and historical network-node service data, along with corresponding service resolutions.

Moreover, the FCO system may employ one or more machine learning algorithms to determine a corresponding service resolution, based on the likely cause of the performance degradation (i.e. service issue). The one or more trained machine learning models may make use of techniques such as supervised learning, unsupervised learning, semi-supervised learning, naive Bayes, Bayesian networks, decision trees, neural networks, fuzzy logic models, multi-class decision forest, and/or probabilistic classification models.

In various examples, the femtocell service data, which includes provisioning data and tunnel data, may be analyzed to deduce QoS parameters such as data packet loss, data latency, jitter, echo, downlink throughput, or uplink throughput. Moreover, FCO systems may further associate each instance of femtocell service data with a corresponding client device identifier. An instance of femtocell service data, as described herein, corresponds to a single communicative connection between a client device and a femtocell device to transmit data via the telecommunications network. In this way, the FCO system may correlate a performance state of the femtocell device with interfacing client devices, or client device types.

Consider a non-limiting example, whereby the FCO system analyzes femtocell service data of a femtocell device and further detects an increase in latency of data transmissions associated with the femtocell device. In this example, the FCO system may further analyze the femtocell service data and network-node service data relative to a femtocell analysis model. In doing so, the FCO system may identify data patterns between the femtocell service data and the femtocell analysis model, and further determine that the data latency is attributable to an interfacing client device type. In this instance, the FCO system may further deduce from the femtocell analysis model a corresponding service resolution. In one example, the service resolution may involve intercepting and terminating a connectivity request that is initiated by a client device and directed towards a femtocell device.

In various examples, the FCO system may generate and deploy service resolutions that include intercepting and terminating femtocell device connectivity requests initiated by client devices that have historically caused a degraded performance state of a femtocell device. In this example, the FCO system may transmit a service resolution data packet to a femtocell device that causes the femtocell device to automatically deny issuances of an Internet Protocol (IP) address to the client device in question. Further, the FCO system may automatically resolve provisioning issues associated with femtocell devices, in response to detecting a decline in performance state over a predetermined time interval (i.e. a measured rate of change of performance over a predetermined time interval). For example, the FCO system may detect an unexpected decline in data packet transmission associated with a femtocell device, based on a historical trend analysis. In this way, the FCO system may preemptively deploy a service resolution data packet to the femtocell device that automatically performs a diagnostic check of the femtocell device, performs a check of provisioning data at the femtocell device, or performs acts to re-provision the femtocell device.

In another example, the FCO system may detect and resolve a service issue associated with a first set of femtocell device(s). The FCO system may further survey a second set of femtocell device(s) within the same geographic area, or adjacent geographic area, for symptoms similar to those identified in the first set of femtocell device(s). In doing so, the FCO system may preemptively deploy a service resolution data packet to the second set of femtocell device(s) that protects the second set of femtocell device(s) from an onset of the service issue that was initially resolved in the first set of femtocell device(s). In a non-limiting example, the FCO system may detect that connectivity between a first femtocell device and a particular type of client device degrades the performance state of the first femtocell device (i.e. cause excessive data latency, etc.) below a predetermined QoS threshold. Thus, the FCO system may generate a service resolution data packet that intercepts and terminates a connectivity request from client devices of the particular client device type in question. The FCO system may then analyze neighboring femtocell device(s) and further deploy the same service resolution data packet to each of the neighboring femtocell device(s) as a means of preemptively protecting the femtocell device(s) from degradations in performance state.

Further, the term "techniques," as used herein, may refer to system(s), method(s), computer-readable instruction(s), module(s), algorithms, hardware logic, and/or operation(s) as permitted by the context described above and through the document.

FIG. 1 illustrates a schematic view of a computing environment 100 that facilitates detecting service issues within a femtocell network and detecting service issues within a corresponding femtocell device. In the illustrated example, a Femtocell Optimization (FCO) system 102 may monitor a performance state of one or more femtocell device(s) 104(1)-104(M) that serves a geographic area 106 of a telecommunications network. The femtocell device(s) 104(1)-104(M) may be configured to improve bandwidth availability over a geographic area 106 serviced by a telecommunications network, relative to base station nodes, such as base station 108, that are traditionally responsible for handling voice and data traffic between client device(s) 110(1)-110(N) and the telecommunications network. The femtocell devices(s) 104(1)-104(N) may correspond to low-power, base-station device(s) that interface with one or more client device(s) 110(1)-110(N) via an over-the-air interface. Further, the femtocell device(s) 104(1)-104(M) may be communicatively connected to a core network 116 via one or more network(s) 112.

The one or more network(s) 112 may include public networks such as the Internet, private networks such as an institutional and/or personal intranet, or some combination of private and public networks. The one or more network(s) 112 can also include any type of wired and/or wireless network, including but not limited to local area network (LANs), wide area networks (WANs), satellite networks, cable networks, Wi-Fi networks, Wi-Max networks, mobile communications networks (e.g. 3G, 4G, and so forth), or any combination thereof.

In the illustrated example, telecommunications network 114 may include multiple base stations, such as base station 108, as well as a core network 116 that serves one or more client device(s) 110(1)-110(N). In the illustrated example, the telecommunications network 114 may provide telecommunications and data communications in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), and/or so forth. The computing environment 100 may include a core network 116. The core network 116 may provide telecommunication and data communication services to multiple client devices, such as a 3G-compatible client device and an LTE an LTE-compatible client device, collectively referred to as client device(s) 110(1)-110(N). The client device(s) 110(1)-110(N) may correspond to any sort of electronic device operating on the telecommunications network, such as a cellular phone, a smartphone, a tablet computer, an electronic reader, a media player, a gaming device, a personal computer (PC, a laptop computer), etc. The client device(s) 110(1)-110(N) may have a subscriber identity module (SIM), such as an eSIM, to identify the respective electronic device to a telecommunications service provider network (also referred to herein as "telecommunications network").

Further, the core network 116 may include a femtocell gateway 118, a femtocell management server 120, an SMP server 122, an Operations Support Systems and File (OSS/F) server 124, and the FCO system 102. The femtocell gateway 118 may interface with the femtocell device(s) 104(1)-104(M) over one or more network(s) 112. The femtocell gateway 118 may aggregate and validate signaling traffic from the femtocell device(s) 104(1)-104(M) and allow data transmission with the core network 116. The femtocell gateway 118 may also aggregate and validate signaling traffic, interface with the femtocell device(s) 104(1)-104(M) for authentication and handshakes with the core network 116. Moreover, a femtocell device(s) 104(1)-104(M) may interface with the femtocell gateway 118 via a security gateway of the core network 116. The security gateway may be a high-density Internet Protocol Security ("IPSec") Gateway that allows the femtocell device(s) 104(1)-104(M) to create secure tunnels with the core network 116 or other outside endpoints to deliver all voice, messaging, and packet data services between the femtocell device(s) 104(1)-104(M) and the core network 116.

The femtocell management server 120 may communicate with the femtocell device(s) 104(1)-104(M) to install or update software or firmware, provision a femtocell device, update parameters, reboot a femtocell device, or some other series of actions. In some examples, the femtocell management server 120 may use a Technical Report 069 (TR-69) communication protocol when communicating with the femtocell device(s) 104(1)-104(M). The TR-69 protocol defines an application layer protocol for remote management of client device(s) connected to an Internet Protocol (IP) network, such as the one or more network(s) 112.

The Service Management Platform (SMP) server 122 may provide management support for the administration of the femtocell device(s) 104(1)-104(M) as well as providing provisioning data. The Operations Support Systems and File (OSS/F) server 124 may communicate with the femtocell device(s) 104(1)-104(M) via the femtocell gateway 118, and further provide management functions, such as, network inventory, network configuration, fault management, and provisioning data.

The FCO system 102 may be configured to analyze femtocell service data (i.e. provisioning data and tunneling data) associated with the femtocell device(s) 104(1)-104(M), optimize resource utilization, deploy service resolutions for detected service issues, or transmit alerts to network representatives for unresolved service issues. The FCO system 102 may be communicatively connected to the femtocell device(s) 104(1)-104(M) via the femtocell gateway 118 and may be further communicatively connected to the femtocell management server 120, SMP server 122, OSS/F server 124, or any combination thereof. In some examples, the FCO system 102 may retrieve femtocell service data from the femtocell device(s) 104(1)-104(M), femtocell management server 120, SMP server 122, OSS/F server 124, or any combination thereof.

Additionally, the FCO system 102 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces that enable communication with other networked devices, such as the client device(s) 110(1)-110(N) via the one or more network(s) 112.

Figure 2:
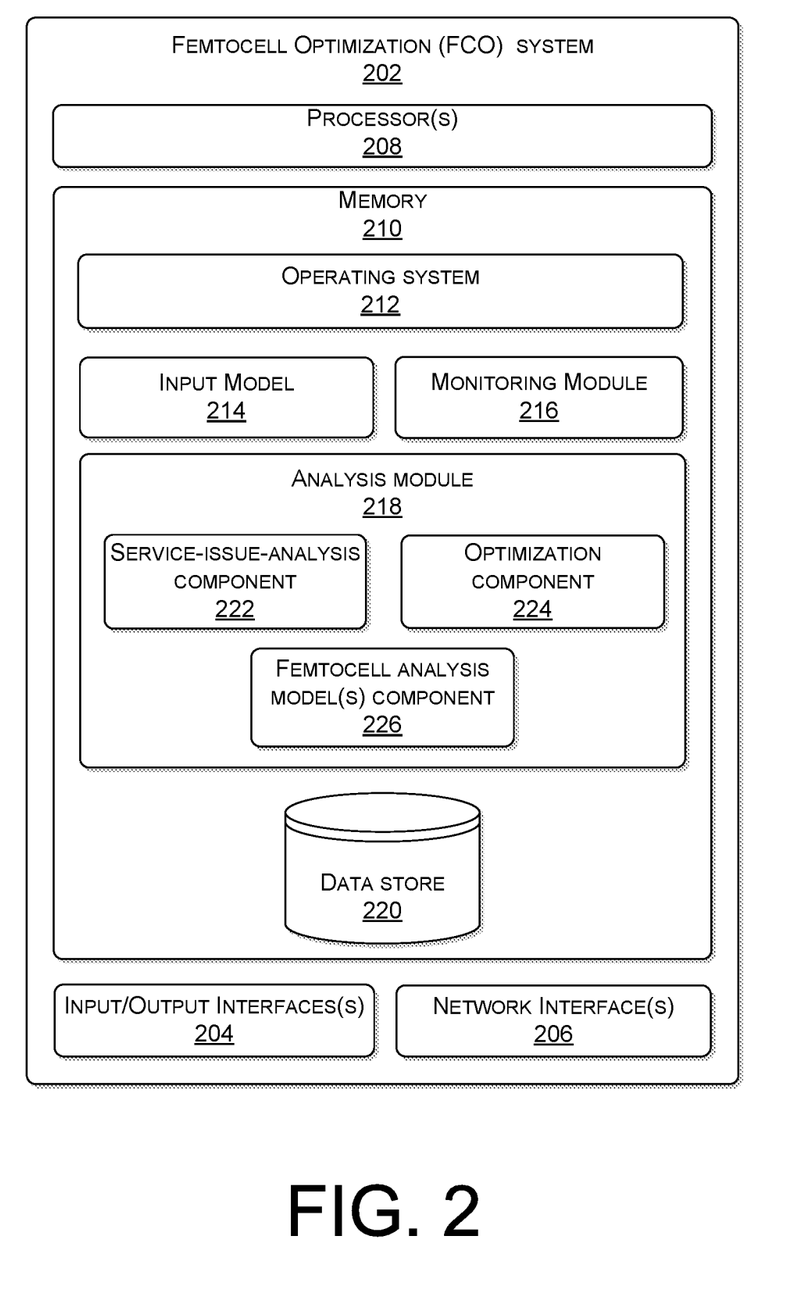
FIG. 2 illustrates a block diagram of various components of a Femtocell Optimization (FCO) system.

FIG. 2 illustrates a block diagram of various components of a Femtocell Optimization (FCO) system. The FCO system 202 may include routines, program instructions, objects, and/or data structures that perform particular tasks or implement abstract data types. Further, the FCO system 202 may include input/output interface(s) 204. The input/output interface(s) 204 may include any type of output interface known in the art, such as a display (e.g. a liquid crystal display), speakers, a vibrating mechanism, or a tactile feedback mechanism. Input/output interface(s) 204 also include ports for one or more peripheral devices, such as headphones, peripheral speakers, or a peripheral display. Further, the input/output interface(s) 204 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the FCO system 202 may include network interface(s) 206, which may include any sort of transceiver known in the art. For example, the network interface(s) 206 may include a radio transceiver that performs the function of transmitting and receiving radio frequency communications via an antenna. In addition, the network interface(s) 206 may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 206 may include wired communication components, such as an Ethernet port or a Universal Serial Bus (USB).

Further, the FCO system 202 may include one or more processor(s) 208 that are operably connected to memory 210. In at least one example, the one or more processor(s) 208 may be a central processing unit(s) (CPU), graphics processing unit(s) (GPU), or both a CPU and GPU or any other sort of processing unit(s). Each of the one or more processor(s) 208 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 208 may also be responsible for executing all computer applications stored in the memory, which can be associated with common types of volatile (RAM) and/or non-volatile (ROM) memory.

In some examples, memory 210 may include system memory, which may be volatile (such as RAM), non-volatile (such as ROM, flash memory, etc.), or some combination of the two. The memory may also include additional data storage devices (removable and/or non-removable) such as, for example, magnetic disks, optical disks, or tape.

The memory 210 may further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 210 may include an operating system 212, an input module 214, a monitoring module 216, an analysis module 218, and a data store 220. The operating system 212 may be any operating system capable of managing computer hardware and software resources.

The input module 214 may receive a service message that indicates a performance state of a telecommunications network, or femtocell device of the telecommunications network. In one example, the input module 214 may receive a service message from a client device that initiates a communicative connection with a femtocell device. In another example, the input module 214 may receive a service message from a femtocell device or another network node of the telecommunications network that interacts with the femtocell device. A network node may correspond to a hardware infrastructure or software infrastructure of the telecommunications network.

Moreover, the input module 214 may further retrieve client profile data from a client device in response to receipt of a service message. The client profile data may indicate an instance of the client device initiating, or attempting to initiate, a communicative connection with at least one femtocell device within a telecommunications network. In doing so, the input module 214 may transmit the client profile data, along with the service message, to an analysis module 218 of the FCO system 202. In this way, the analysis module 218 may use the client profile data to determine a geographic location of the client device, and thus further identify femtocell devices or network nodes that are likely a cause of the service issue experienced by the client device within the telecommunications network.

The monitoring module 216 may monitor femtocell service data associated with femtocell device(s) that serve a geographic area of a telecommunications network. The femtocell service data may include provisioning data and tunnel data associated with each of the femtocell device(s). The provisioning data may include communication data packets sent to and from femtocell device(s), identity information of the femtocell device(s), and associated settings for provisioning each of the femtocell device(s). The tunnel data may include a device identifier associated with the client device initiating a communicative connection, via a femtocell device, with an intended destination IP address, as specified by the client device. In some examples, the device identifier may correspond to a source IP address of the client device. The tunnel data may further include a timestamp indicating when the tunnels (i.e. communicative connections established between a client device and destination IP address via a femtocell device) were created, packet information indicating the size and type of data packets being sent and/or received, and the endpoints of the tunnels (i.e. client device and destination IP address).

Further, the monitoring module 216 may monitor femtocell service data on a continuous basis, per a predetermined schedule, or in response to a triggering event. The predetermined schedule may correspond to any time interval is possible. Further, the triggering event may correspond to receipt of an indication that a performance state of the telecommunications network within a geographic area has fallen below a predetermined Quality of Service (QoS) threshold.

Further, the monitoring module 216 may monitor and retrieve network-node service data associated with one or more network node(s) that interact with femtocell device(s) within the telecommunications network. The one or more network nodes may correspond to hardware infrastructure or software infrastructure of the telecommunications network, such as the OSS/FS server 124, SMP server 122, and femtocell management server 120. Moreover, network-node service data may include, but is not limited to, an indication of network latency, downlink throughput, uplink throughput, or a network-specific data associated with hardware or software elements. In a non-limiting example, network-node service data may correspond to provisioning data provided to femtocell device(s) by one of the OSS/FS server 124, SMP server 122, or femtocell management server 120, network node(s).

The purpose of monitoring femtocell device(s) and network node(s) is to determine a likely root cause of a performance degradation (i.e. service issue) that is impacting a femtocell device. For example, a femtocell device may exhibit the effects of a service issue (i.e. degraded performance state), however the cause of the service issue may reside with a network node that interacts with the femtocell device. In a non-limiting example, a femtocell device may fail to establish a communicative connection with a client device due to flawed provisioning data provided by one of an OSS/FS server 124, SMP server 122, or femtocell management server 120.

In various examples, the monitoring module 216 may monitor one or more network node(s) on a continuous basis, per a predetermined schedule, or in response to a triggering event. The predetermined schedule may correspond to any time interval, and the triggering event may correspond to receipt of an indication that a performance state of the telecommunication network within a geographic area associated with the network node, has fallen below a predetermined QoS threshold.

The analysis module 218 may further include a service-issue-analysis component 222, an optimization component 224, and a femtocell-analysis-model(s) component 226. In one example, the service-issue-analysis component 222 may analyze femtocell service data associated with a femtocell device to determine whether the performance state of the femtocell device is greater than or equal to a predetermined QoS threshold. The service-issue-analysis component 222 may determine that a service issue exists in response to the performance state being less than a predetermined QoS threshold.

In some examples, the service-issue-analysis component 222 may employ one or more trained machine learning models to further determine a likely cause of a performance degradation (i.e. service issue) that is impacting a femtocell device. More specifically, the service-issue-analysis component 222 may analyze femtocell service data associated with the impacted femtocell device along with network-node service data associated with interacting network node(s). In one example, the service-issue-analysis component 222 may retrieve, from the data store 220, historical femtocell service data associated with a subset of femtocell device(s) and historical network-node service data associated with the interacting network node(s). The subset of femtocell device(s) may correspond to one of the femtocell device that is exhibiting a degraded performance state, a grouping of femtocell device(s) that service a same predetermined geographic area within the telecommunications network, or a grouping of similar types of femtocell device(s) within the telecommunications network.

Further, the service-issue-analysis component 222 may employ one or more machine learning algorithms to correlate femtocell service data associated with the impacted femtocell device with historical femtocell service data associated with the subset of femtocell devices, and network-node service data associated with interacting network node(s) with corresponding historical network-node service data. In this way, the service-issue-analysis component 222 may determine whether a likely cause of the performance degradation (i.e. service issue) impacting the femtocell device originates at the femtocell device itself, or an interacting network node.

In doing so, the service-issue-analysis component 222 may further determine a corresponding service resolution, based on the likely cause of the performance degradation. The service-issue-analysis component 222 may employ one or more trained machine learning models to analyze the femtocell service data, the network-node service data, or a combination of both, to further determine a service resolution. The one or more trained machine learning models may make use of techniques such as supervised learning, unsupervised learning, semi-supervised learning, naive Bayes, Bayesian networks, decision trees, neural networks, fuzzy logic models, multiclass decision forest, and/or probabilistic classification models. In one example, the service-issue-analysis component 222 may be unable to identify the likely cause of a performance degradation (i.e. service issue). In another example, the service-issue-analysis component 222 may be able to identify the service issue, however may not be able to determine a corresponding service resolution. In each of these examples, the service-issue-analysis component 222 may transmit a service message requesting further analysis to a service representative of the telecommunications network or a service representative of the FCO system.

The optimization component 224 may employ one or more trained machine learning models to determine whether the service issue impacts one or more additional femtocell device(s) that service a predetermined geographic area of the telecommunications network. In one example, the FCO system may identify a subset of additional femtocell device(s) based on proximity to the impacted femtocell device. In doing so, the FCO system may retrieve femtocell service data from each of the additional femtocell device(s) to determine whether a corresponding degradation of performance state has occurred. By way of example, the optimization component 224 may determine that a performance state of a first femtocell device is impacted by a provisioning data being used to configure the femtocell device. The FCO system may further identify a set of additional femtocell devices that service the same predetermined geographic area, or a different predetermined geographic region, that use the same provisioning data. In these examples, the FCO system may generate and deploy a service resolution data packet to resolve the provisioning data on the first femtocell device and the set of additional femtocell devices. Alternatively, or additionally, the FCO system may generate and deploy a service resolution data packet to network nodes other than femtocell device(s). A network node may correspond to a hardware infrastructure or software infrastructure of the telecommunications network. For example, the service-issue-analysis component 222 may determine that a degradation of performance state has occurred due to provisioning data provided to a femtocell device by one of an OSS/FS server 124, SMP server 122, or femtocell management server 120 of the telecommunications network. In this example, the FCO system may generate and deploy the service resolution data packet to one of the OSS/FS server 124, SMP server 122, or femtocell management server 120. The service resolution data packet may include computer-executable instructions that automatically update provisioning data.

The femtocell-analysis-model(s) component 226 may generate one or more femtocell analysis models over a predetermined time interval. The one or more femtocell analysis models may correlate historical instances of service issues that have impacted one or more femtocell device(s) with femtocell service data associated with the one or more femtocell device(s), network-node service data of one or more network node(s) that interact with the one or more femtocell device(s), or a combination of both. Moreover, the predetermined time interval for which the femtocell analysis models are defined, may be 30 days, six months, one year, or five years. Any predetermined time interval is possible. The femtocell analysis model may further correlate known service issues with corresponding service resolutions. In doing so, the FCO system may use one or more trained machine learning models to analyze current femtocell service data or current network-node service data relative to data-points within the femtocell analysis model to identify a service issue impacting at least one femtocell device, and whether a corresponding service resolution is known, and may be deployed as a corrective action.

Development of a femtocell analysis model that uses femtocell service data may be an iterative process. Femtocell service data from one or more femtocell device(s), or from over one or more predetermined time period(s), or a combination of both, may be continuously evaluated to progressively refine the femtocell analysis model. As more femtocell service data becomes available, a continuously more accurate femtocell analysis model may be developed. In various examples, femtocell service data, as it is learned, is persisted, for example, in the data store 220 as stored femtocell service data, or as a data-point within a femtocell analysis model. Stored femtocell service data may be continuously associated with corresponding service resolutions, such that a correlation between current femtocell service data and stored femtocell service data may trigger execution of a corresponding service resolution.

The data store 220 may store historical femtocell service data associated with femtocell device(s) within the telecommunications network. The data store 220 may further include historical instances of service issues that have impacted femtocell device(s) along with corresponding service resolutions. Further, the data store 220 may store historical network-node service data associated with network node(s) within the telecommunications network, historical instances of service issues caused by network node(s) that have impacted femtocell device(s), and corresponding service resolutions.

Figure 3:
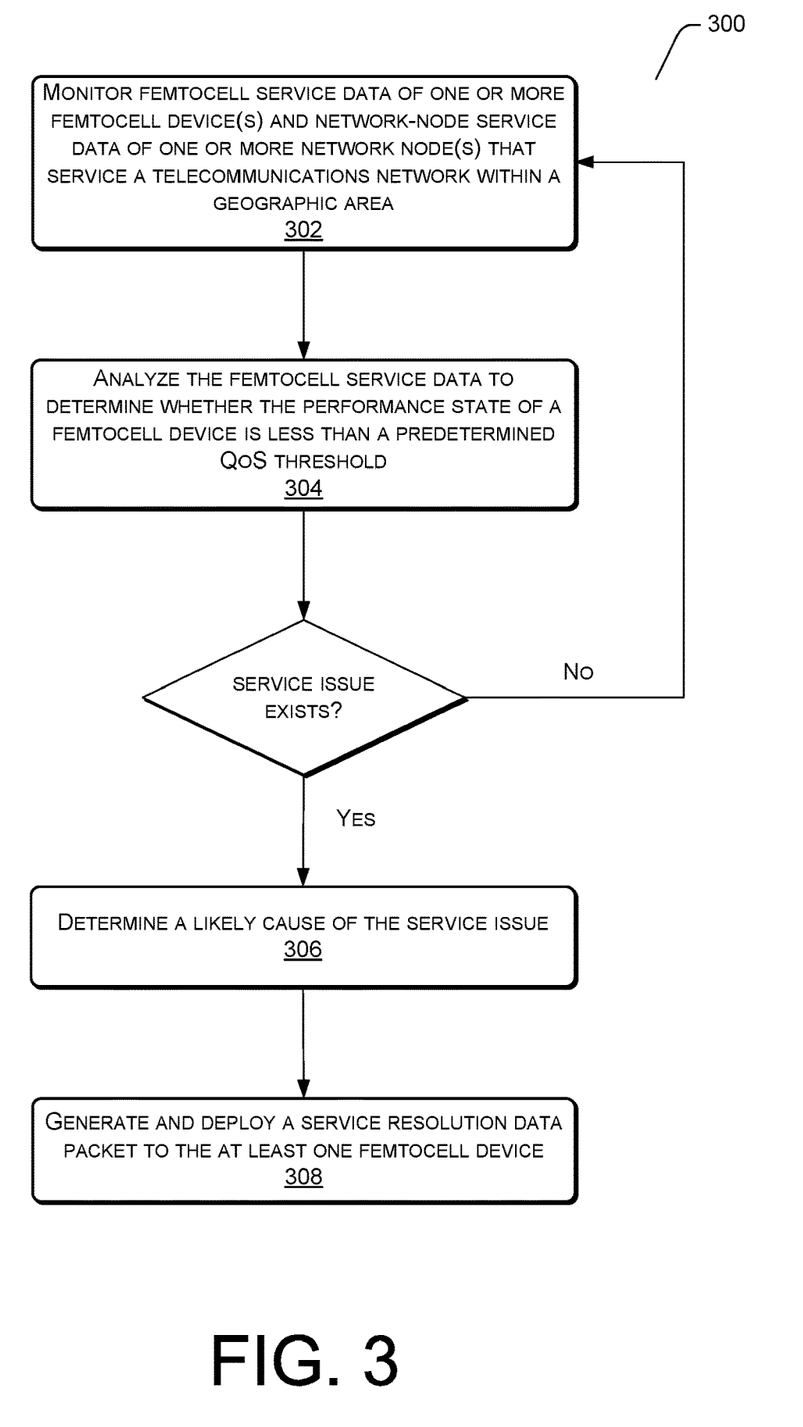
FIG. 3 illustrates a flow diagram that describes an FCO system process for monitoring a femtocell device, and further determining whether a real-time service issue may affect a current or future performance of the femtocell device.
Figure 4:
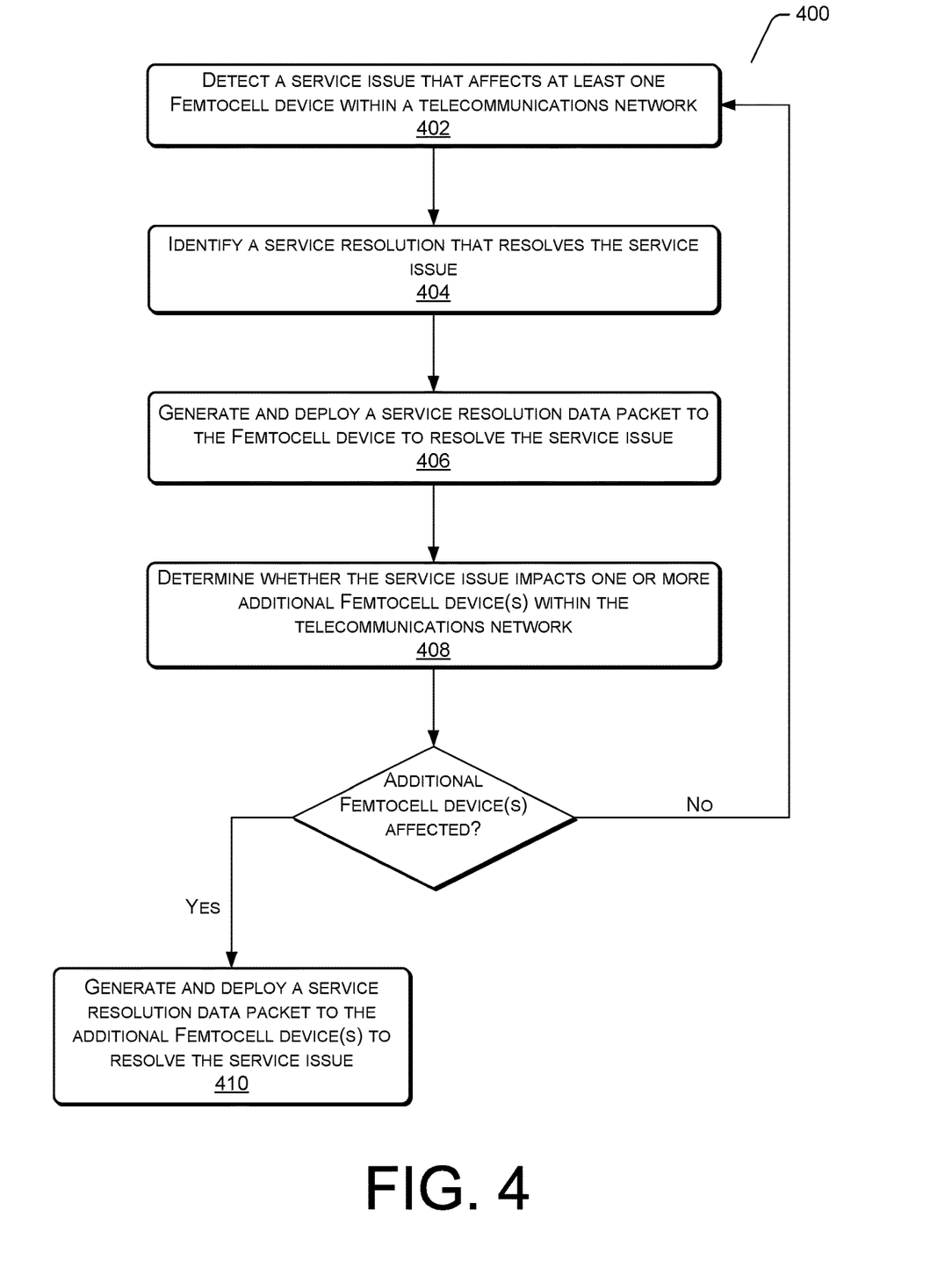
FIG. 4 illustrates a flow diagram that describes an FCO system process for determining whether a service issue detected on a femtocell device may impact additional femtocell devices that service a predetermined geographic area of a telecommunications network.
Figure 5:
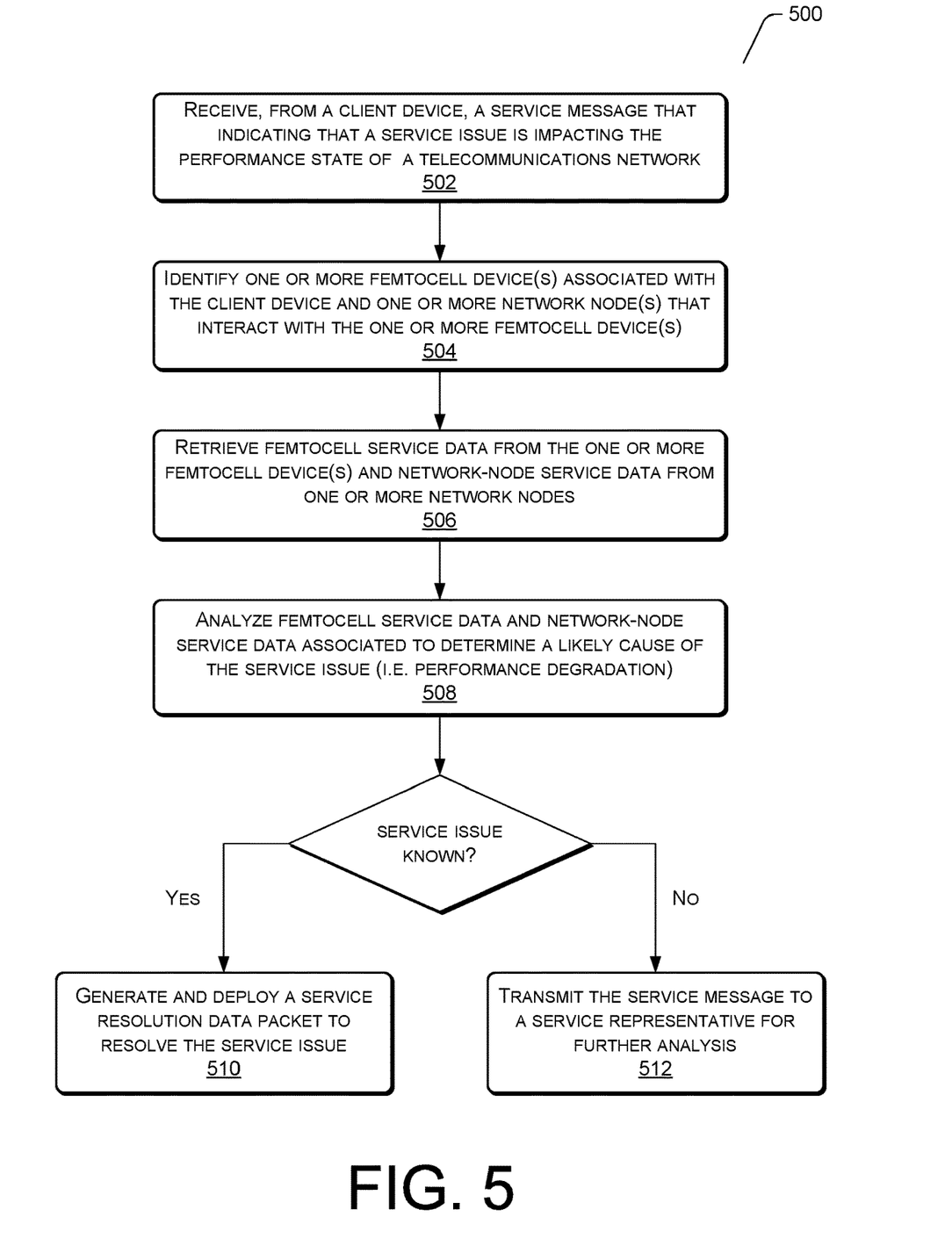
FIG. 5 illustrates a flow diagram that describes an FCO system process for determining whether a service issue associated with a femtocell device is a known service issue.

FIGS. 3, 4, and 5 present processes 300, 400, and 500 that relate to operations of the Femtocell (FCO) Optimization system. Each of processes 300, 400, and 500 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300, 400, and 500 are described with reference to the computing environment 100 of FIG. 1.

FIG. 3 illustrates a flow diagram that describes an FCO system process for monitoring femtocell service data of a femtocell device, and further determining whether a real-time service issue may affect a current or future performance of the femtocell device. In some examples, the real-time service issue at a femtocell device may relate to data packet loss, data latency, jitter, echo, downlink throughput, or uplink throughput.

At 302, the FCO system may monitor and retrieve femtocell service data of one or more femtocell device(s) that service a telecommunications network within a predetermined geographic area. In some examples, the FCO system may also monitor and retrieve network-node service data associated with one or more network node(s) that interact with the femtocell device(s). The femtocell service data may include provisioning data and tunneling data. Provisioning data may relate to configuration settings associated with a femtocell device for servicing a geographic area. Tunneling data may include data relating to a communicative connection that is established, via a femtocell device, between a client device and an intended destination IP address. Tunnel data may include identity information associated with the endpoints of the communication channel, a timestamp indicating when the tunnels were created, packet information indicating the size and the type of data packets being sent and/or received. Further, the network-node service data may correspond to provisioning data provided to femtocell device(s) by one of the OSS/FS server, SMP server, or femtocell management server, network node(s).

At 304, the FCO system may analyze the femtocell service data to determine whether the performance state of the femtocell device is less than a predetermined QoS threshold. A performance state that is less than a QoS threshold may indicate that a service issue exists. Alternatively, a performance state greater than or equal to a predetermined QoS threshold may indicate that a service issue does not exist.

At 306, the FCO system determine that a service issue does impact a femtocell device. In doing so, the FCO system may employ one or more trained machine learning models to further determine a likely cause of a performance degradation (i.e. service issue). In one example, the FCO system may use one or more trained machine learning algorithms to correlate femtocell service data associated with an impacted femtocell device with historical femtocell service data associated with a subset of femtocell devices, and network-node service data associated with interacting network node(s) with corresponding historical network-node service data. In this way, the FCO system may determine whether a likely cause of the performance degradation (i.e. service issue) impacting the femtocell device originates at the impacted femtocell device itself, or an interacting network node.

In another example, the FCO system may generate a femtocell analysis model using historical femtocell service data and historical network-node service data. In doing so, the FCO system may identify a likely cause of a performance degradation (i.e. service issue) by correlating current femtocell service data and current network-node service data with data-points of the femtocell analysis model.

At 308, the FCO system may further employ one or more machine learning algorithms to determine a corresponding service resolution, based on the likely cause of the performance degradation (i.e. service issue), based on analysis of the femtocell service data and the network-node service data. In one example, the FCO system may parse through a data store to identify a service resolution that resolves the performance degradation. In this way, the FCO system may resolve the service issue by generating and deploying a service resolution data packet to one or more femtocell device(s) or network node(s). The service resolution data packet may include computer-executable instructions that automatically execute the service resolution.

In another example, the FCO system may analyze the femtocell service data of the femtocell device relative to the femtocell analysis model, and further identify the service resolution based at least in part on a correlation of the femtocell service data and network-node service data, with data-points of the femtocell analysis model.

Alternatively, the FCO system may determine that the real-time service issue does not impact a femtocell device. In this instance, the FCO system process may return to step 302, and the FCO system may continue to monitor femtocell service data of one or more femtocell device(s).

FIG. 4 illustrates a flow diagram that describes an FCO system process for determining whether a service issue detected on a femtocell device may impact additional femtocell devices that service a predetermined geographic area of a telecommunications network. By way of example, the FCO system may determine that a performance state of a first femtocell device is impacted by a provisioning data being used to configure the femtocell device. The FCO system may further identify a set of additional femtocell devices that service the same predetermined geographic area, or a different predetermined geographic region, that use the same provisioning data. Thus, the FCO system may generate and deploy a service resolution data packet to resolve the provisioning data on the first femtocell device and the set of additional femtocell devices.

At 402, the FCO system may detect a service issue that affects at least one femtocell device that services a geographic area within a telecommunications network. In a non-limiting example, the FCO system may determine that the service issue relates to the client device that is initiating a communicative connection via the femtocell device.

In one example, the FCO system may detect the service issue by monitoring the femtocell device on a continuous basis, per a predetermined schedule, or in response to a triggering event. The FCO system may retrieve femtocell service data from the femtocell device, and further, analyze the femtocell service data to determine that the performance state of the femtocell device is less than a predetermined threshold. In this way, the FCO system deduces that a service issue impacts the femtocell device. Additionally, or alternatively, the FCO system may retrieve at least a portion of femtocell service data from a femtocell management server, an Operations Support Systems/File (OSS/F) server, or a Service Management Platform (SMP) server associated with the telecommunications network. In this example, the FCO system may retrieve a remaining portion of femtocell service data, itself, from the femtocell device.

In some examples, the performance state of the femtocell device may relate to one or more of data packet loss, data latency, jitter, echo, downlink throughput, or uplink throughput. Further, the QoS threshold may correspond to the same and may be set by an administrator of the telecommunications network, or an administrator the FCO system.

At 404, the FCO system may identify a service resolution that resolves the service issue. In one example, the FCO system may parse through a data store to identify a service resolution that corresponds to the service issue. In another example, the FCO system may analyze the femtocell service data of the femtocell device relative to a femtocell analysis model, and further, identify the service resolution based at least in part on a correlation of the femtocell service data and data-points within the femtocell analysis model.

At 406, the FCO system may generate and deploy a service resolution data packet to the impacted femtocell device. The service resolution data packet may include computer-executable instructions that automatically execute the service resolution on the impacted femtocell device.

At 408, the FCO system may determine whether the service issue impacts one or more additional femtocell device(s) that service a predetermined geographic area of the telecommunications network. In one example, the FCO system may identify a subset of additional femtocell device(s) based on proximity to the impacted femtocell device. In doing so, the FCO system may retrieve femtocell service data from each of the additional femtocell device(s) to determine whether a corresponding degradation of performance state has occurred.

Additionally, or alternatively, the FCO system may determine, at step 402, that the service issue relates to client devices that initiate a communicative connection with a femtocell device. More specifically, the service issue may be based on a device type, a device model, or an application (i.e. operating system or a user application) that is being executed on the client device. In this example, the FCO system may determine that the service issue impacts one or more additional femtocell device(s) that are likely to interact with client devices of the same device type, the same device model, or the same application that is being executed on the client device.

At 410, the FCO system may determine that the additional femtocell device(s) are impacted by the service issue. In doing so, the FCO system may deploy the service resolution data packet to the additional femtocell device(s) to resolve the service issue.

Alternatively, the FCO system may determine that additional femtocell device(s) are not impacted by the service issue. In this instance, the FCO system process may return to step 402, and the FCO system may continue to monitor a femtocell device on a continuous basis, per a predetermined schedule, or in response to a triggering event.

FIG. 5 illustrates a flow diagram that describes an FCO system process for determining whether a service issue associated with a femtocell device is a known service issue. In one example, a service issue may be a known service issue that has previously been encountered and resolved by the FCO system. Alternatively, the service issue may be unrelated to previous instances of service issues or may have been previously encountered but yet remains unresolved. In these examples, the FCO system may transmit a service message to a service representative of the telecommunications network, or a service representative of the FCO system for further analysis.

At 502, the FCO system may receive a service message, from a client device, that indicates that a service issue is impacting the performance state of a telecommunications network. In one example, the service issue, as experienced by the client device, may relate to data packet loss, data latency, jitter, echo, downlink throughput, or uplink throughput at a femtocell device.

Moreover, the FCO system may retrieve, from the client device, client profile data that indicates an instance of the client device initiating a communicative connection with at least one femtocell device of the telecommunications network. In doing so, the FCO system may use the client profile data to identify a likely femtocell device, along with other femtocell devices within a same predetermined geographic area, that is a likely cause of service issue.

At 504, the FCO system may identify one or more femtocell device(s) associated with the client device. In one example, the FCO system may identify the one or more femtocell device(s) based on a geographic area of the client device within the telecommunications network. Further, the FCO system may also identify one or more network node(s) that interact with the one or more femtocell device(s).

At 506, the FCO system may retrieve femtocell service data from the one or more femtocell device(s), and network-node service data from the one or more network node(s). The femtocell service data may include provisioning data and tunnel data associated with the femtocell device. The provisioning data include communication data packets sent to and from the femtocell device, identity information of the femtocell device, and associated settings for provisioning the femtocell device. The tunnel data further include a device identifier associated with the client device initiating the communicative connection via the femtocell device or a source IP address associated with the client device, and an intended destination IP address as specified by the client device. The tunnel data may further include a timestamp indicating when the tunnels were created, packet information indicating the size and type of data packets being sent and/or received, and the endpoints of the tunnels. Further, the network-node service data may correspond to provisioning data provided to the one or more femtocell device(s) by one of the OSS/FS server, SMP server, or femtocell management server, network node(s).

At 508, the FCO system may identify the likely cause of the service issue by analyzing the femtocell service data and the network-node service data. More specifically, the FCO system may use one or more trained machine learning models to correlate femtocell service data associated with an impacted femtocell device historical femtocell service data, and network-node service data associated with interacting network node(s) with corresponding historical network-node service data.

At 510, the FCO system may identify the service issue, based at least in part on an analysis of the femtocell service data and network-node service data. The FCO system may further identify a service resolution that resolves the service issue. In one example, the FCO system may parse through a data store to identify a service resolution that corresponds to the service issue. In another example, the FCO system may analyze the femtocell service data of the femtocell device relative to a femtocell analysis model, and further, identify the service resolution based at least in part on a correlation of the femtocell service data and network-node service data, with data-points of the femtocell analysis model.

In doing so, the FCO system may generate and deploy a service resolution data packet to the one or more femtocell device(s) or the one or more network node(s) associated with the service issue. The service resolution data packet may include computer-executable instructions that automatically execute the service resolution.

At 512, the FCO system may determine that the service issue cannot be identified, based at least in part on the analysis of the femtocell service data and network-node service data. In this example, the FCO system may transmit a service message to a service representative of the telecommunications network for further analysis of the service message received in step 502.

In some examples, the FCO system may identify the service issue, however, be unable to identify a service resolution to resolve the service issue. In these examples, the FCO system may also transmit the service message to the service representative of the telecommunications network for further analysis of the service message received in step 502.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A computer-implemented method, comprising:
 under control of one or more processors:
 retrieving femtocell service data associated with one or more femtocell devices that service a predetermined geographic area of a telecommunications network, the femtocell service data including at least one of provisioning data or tunnel data associated with the one or more femtocell devices, the provisioning data corresponding to at least configuration settings for provisioning the one or more femtocell devices to communicate with client devices, and the tunnel data corresponding to at least packet information indicating a size and type of data packets being sent or received at the client devices;
 analyzing the femtocell service data;
 determining that a performance state of an impacted femtocell device of the one or more femtocell devices is less than a predetermined Quality of Service (QoS) threshold, based at least in part on analysis of the femtocell service data;

identifying a service issue associated with the performance state of the impacted femtocell device;
generating a set of service resolution data to resolve the service issue;
determining an impact of the service issue on additional femtocell devices, based at least in part on analysis of the femtocell service data associated with the impacted femtocell device; and
deploying the set of service resolution data to the impacted femtocell device and the additional femtocell devices.

2. The computer-implemented method of claim 1, wherein the femtocell is retrieved from the one or more femtocell devices, and
wherein, analyzing the femtocell service data further comprises determining, via one or more trained machine learning algorithms corresponding performance states of the one or more femtocell devices relative to the predetermined QoS threshold.

3. The computer-implemented method of claim 1, further comprising:
retrieving, from a data store, historical instances of femtocell service data that includes historical instances of service issues that have impacted the telecommunications network; and
analyzing the femtocell service data of the impacted femtocell device using one or more trained machine learning algorithms to identify data patterns between the femtocell service data and historical instances of femtocell service data associated the telecommunications network, and
wherein, identifying the service issue is based at least in part on the data patterns.

4. The computer-implemented method of claim 1, further comprising:
retrieving, from a data store, historical instances of service resolutions that have resolved one or more historical service issues associated with the telecommunications network; and
analyzing the historical instances of service resolutions using one or more trained machine learning algorithms, and
wherein generating the set of service resolution data is based at least in part on analysis of the historical instances of service resolutions.

5. The computer-implemented method of claim 1, further comprising:
retrieving, from a data store, historical instances of femtocell service data associated with the telecommunications network; and
generating a femtocell analysis model that correlates historical femtocell service data with corresponding one or more femtocell devices within the predetermined geographic area of the telecommunications network, and
wherein, analyzing the femtocell service data includes identifying data patterns between the femtocell service data associated with the impacted femtocell device and data-points within the femtocell analysis model.

6. The computer-implemented method of claim 1, further comprising:
accessing, from within a core network of the telecommunications network, one of a femtocell management server, an operations support system and file (OSS/F) server, or a service management platform (SMP) server, and
retrieving, from one of the femtocell management server, the OSS/F server, or the SMP server, at least a portion of the femtocell service data associated with the impacted femtocell device; and
retrieving, from the impacted femtocell device, a remaining portion of the femtocell service data.

7. The computer-implemented method of claim 1, further comprising:
analyzing the femtocell service data of the impacted femtocell device using one or more trained machine learning algorithms to identify data patterns between the femtocell service data and historical instances of femtocell service data associated the telecommunications network; and
determining that a service resolution is not available for the service issue, and
wherein, generating the set of service resolution data includes transmitting a message to an administrator of the impacted femtocell device or an administrator of the telecommunications network that identifies the service issue and indicates that further analysis is required to resolve the service issue.

8. The computer-implemented method of claim 1, further comprising:
identifying the additional femtocell devices based on a femtocell device type.

9. The computer-implemented method of claim 1, wherein the service issue is associated with the provisioning data that is used to configure the impacted femtocell device to service the predetermined geographic area, and
wherein, identifying the additional femtocell devices is based at least in part on a common use of the provisioning data.

10. The computer-implemented method of claim 1, wherein the service issue corresponds to a data latency attributable to a client device type, and
wherein the set of service resolution data corresponds to intercepting and terminating femtocell device connectivity requests initiated by one or more client devices that correspond to the client device type.

11. The computer-implemented method of claim 1, further comprising:
determining that the service issue is associated with a user application executed on a client device, and
wherein, identifying the additional femtocell devices is based at least in part on determining an interaction between the additional femtocell devices and the application.

12. A system, comprising:
one or more processors;
memory coupled to the one or more processors, the memory including one or more modules that are executable by the one or more processors to:
monitor a performance state of one or more femtocell devices that service a predetermined geographic area of a telecommunications network;
retrieve femtocell service data associated with the one or more femtocell devices, the femtocell service data including at least one of provisioning data or tunnel data associated with the one or more femtocell devices, the provisioning data corresponding to at least configuration settings for provisioning the one or more femtocell devices to communicate with client devices, and the tunnel data corresponding to at least packet information indicating a size and type of data packets being sent or received at the client devices;

generate a femtocell analysis model that correlates femtocell service data of the one or more femtocell devices with historical instances of femtocell service data associated with the telecommunications network;

analyze the femtocell service data of the one or more femtocell devices by using one or more trained machine learning algorithms to identify data patterns between the femtocell service data and data-points within the femtocell analysis model;

detect a service issue that impacts the performance state of an impacted femtocell device of the one or more femtocell devices, based at least in part on analysis of the femtocell service data;

generate a set of service resolution data to resolve the service issue, the set of service resolution data to include computer-executable instructions that automatically execute a service resolution on the impacted femtocell device;

determine an impact of the service issue on additional femtocell devices, based at least in part on analysis of the femtocell service data associated with the impacted femtocell device; and deploy the set of service resolution data to the impacted femtocell device and the additional femtocell devices.

13. The system of claim 12, wherein the one or more modules are further executable by the one or more processors to:

analyze the femtocell service data of the one or more femtocell devices using one or more trained machine learning models to further identify the service resolution associated with the service issue, based at least in part on a correlation of the femtocell service data and data-points within the femtocell analysis model.

14. The system of claim 12, wherein the one or more modules are further executable by the one or more processors to:

determine that the performance state of the impacted femtocell device is less than a predetermined Quality of Service (QoS) threshold, based at least in part on analysis of the femtocell service data, the performance state corresponding to a QoS parameter that is associated with one of data packet loss, data latency, jitter, echo, downlink throughput, or uplink throughput; and identify the impacted femtocell device, based at least in part on the performance state being less than the predetermined QoS threshold.

15. The system of claim 12, wherein the one or more modules are further executable by the one or more processors to:

receive, from a client device, a service message indicating that a service issue is impacting a QoS of the telecommunications network; and retrieve, from the client device, client profile data that indicates an instance of initiating a communicative connection with at least one femtocell device of the telecommunications network, and wherein, to monitor the performance state of the one or more femtocell devices is based at least in part on the service message and the client profile data associated with the client device.

16. One or more non-transitory computer-readable media storing computer-executable instructions, that when executed on one or more processors, cause the one or more processors to perform acts comprising:

receiving, from a client device, a service message indicating that a service issue is impacting a performance state of a telecommunications network;

retrieving femtocell service data associated with one or more femtocell devices within a predetermined geographic area of the telecommunications network, based at least in part on the service message, the femtocell service data including at least one of provisioning data or tunnel data that is associated with the one or more femtocell devices, the provisioning data corresponding to at least configuration settings for provisioning the one or more femtocell devices to communicate with client devices and the tunnel data corresponding to at least packet information indicating a size and type of data packets being sent or received at the client devices;

analyzing the femtocell service data using one or more trained machine learning algorithms to determine that a performance state of an impacted femtocell device of the one or more femtocell devices is less than a predetermined Quality of Service (QoS) threshold;

determining, via the one or more trained machine learning algorithms, a service resolution to resolve the service issue, based at least in part on analysis of the femtocell service data;

generating a set of service resolution data that includes computer-executable instructions to automatically execute the service resolution;

determining an impact of the service issue on additional femtocell devices, based at least in part on analysis of the femtocell service data associated with the impacted femtocell device; and deploying the set of service resolution data to the impacted femtocell device and the additional femtocell devices.

17. The one or more non-transitory computer-readable media of claim 16, further storing instructions that, when executed on the one or more processors, cause the one or more processors to perform acts comprising:

generating a femtocell analysis model that correlates femtocell service data of the one or more femtocell devices with historical instances of femtocell service data associated with the predetermined geographic area of the telecommunications network over a predetermined time interval; and identifying the service issue associated with the performance state of the impacted femtocell device by using one or more trained machine learning algorithms to identify data patterns between the femtocell service data and data-points within the femtocell analysis model.

18. The one or more non-transitory computer-readable media of claim 17, wherein generating the set of service resolution data to resolve the service issue is further based at least in part on data patterns between the femtocell service data and data-points within the femtocell analysis model.

19. The one or more non-transitory computer-readable media of claim 17, wherein the QoS threshold corresponds to a minimum quality of service measure of voice or data transmissions over the telecommunications network, the QoS threshold corresponding to one of a data packet loss, data latency, jitter, echo, downlink throughput, or uplink throughput.

* * * * *